United States Patent [19]

Mueller et al.

[11] Patent Number: 4,835,196

[45] Date of Patent: May 30, 1989

[54] PROCESS FOR THE PRODUCTION OF A FREE FLOWING FILLED ELASTOMER POWDER

[75] Inventors: Michael Mueller, Muenster; Walter Kleinert, Velen, both of Fed. Rep. of Germany

[73] Assignee: Huels Aktiengesellschaft, Marl, Fed. Rep. of Germany

[21] Appl. No.: 20,929

[22] Filed: Mar. 2, 1987

[30] Foreign Application Priority Data

Mar. 1, 1986 [DE] Fed. Rep. of Germany ....... 3606743

[51] Int. Cl.$^4$ .......... C08K 3/04; C08L 21/00; C08J 3/16; C08C 1/15
[52] U.S. Cl. .................... 523/334; 524/99; 524/236; 524/492; 524/501
[58] Field of Search ............... 523/334; 524/501, 492, 524/99, 236

[56] References Cited

U.S. PATENT DOCUMENTS

| | | | |
|---|---|---|---|
| 3,998,778 | 12/1976 | Berg et al. | 523/334 |
| 4,065,426 | 12/1977 | Yamawaki et al. | 523/334 |
| 4,073,755 | 2/1978 | Berg et al. | 523/334 |
| 4,138,375 | 2/1979 | Berg et al. | 523/334 |
| 4,482,657 | 11/1984 | Fischer et al. | 523/334 |
| 4,771,092 | 9/1988 | Ollenik et al. | 524/492 |

FOREIGN PATENT DOCUMENTS 903892 1/1960 United Kingdom .

*Primary Examiner*—Herbert J. Lilling
*Attorney, Agent, or Firm*—Millen and White

[57] ABSTRACT

A process for the production of a free flowing filled elastomer powder by combining an elastomer latex with a filler suspension is disclosed wherein the combining of elastomer latex and filler suspension takes place in the presence of about 0.1-15 parts by weight—calculated per 100 parts by weight of elastomer solid in the elastomer latex—of a high-molecular-weight amine with quaternary nitrogen functions and with an average molecular weight of about $10^4$ to $10^8$.

20 Claims, No Drawings

PROCESS FOR THE PRODUCTION OF A FREE FLOWING FILLED ELASTOMER POWDER

BACKGROUND OF THE INVENTION

The invention relates to a process for the production of a free flowing, filled elastomer powder by combining, under stirring, an aqueous elastomer latex which contains auxiliary agents with an aqueous filler suspension, separating the aqueous phase and finally drying the elastomer powder under constant agitation. The invention also relates to pourable, filled elastomer powders produced according to this process.

The manufacture of pourable, filled elastomer powders is basically conventional. Thus, German Pat. No. 2,822,148 discloses, inter alia, the production of pourable, filled elastomer powders. An essential feature in the known mode of operation resides in having to set a very narrow, acidic pH range, the precipitation of the elastomer having to be executed perforce in the presence of water glass and aluminum salts. On account of this fact, the finished elastomer powder contains in every case silicon compounds and aluminum compounds as troublesome filler components. It has furthermore been found under practical conditions that the resultant elastomer powders, for example at low-filler grades, exhibit low mechanical stability since they are too soft, or, for example in case of high filler contents, tend very strongly to produce undesirable, i.e. dangerous, dust emission.

Polyamines are known in industry as flocculating agents. They serve the purpose of precipitating, quickly and completely, very fine and difficult to separate particles (slurries). The thus-precipitated particles are obtained as flocs of irregular shape and size.

Low-molecular-weight polyamines have been disclosed for the plastics industry (German Pat. No. 1,195,941). According to the cited reference, these low-molecular-weight polyamines are utilized, inter alia, for the production of elastomer/silicic acid mixtures. As a special feature, the disclosure mentions that the latex utilized must have been prepared using specific emulsifiers. According to this reference, it is not possible to make use of the entire spectrum of usable emulsifiers and/or fillers. The disclosure does not include the production of free flowing elastomer powder.

SUMMARY OF THE INVENTION

It is an object of this invention to provide a process for producing a filled elastomer which is markedly less sensitive with respect to the required pH value range.

Another of object of this invention is to provide a process for producing a filled, free flowing elastomer which eliminates the forcible utilization of silicon compounds and aluminum compounds.

Upon further study of the specification and appended claims, further objects and advantages of this invention will become apparent to those skilled in the art.

These objects have been attained by combining the elastomer latex and the filler suspension in the presence of about 0.1-15 parts by weight—calculated per 100 parts by weight of elastomer solid in the elastomer latex—of a high-molecular-weight amine with quaternary nitrogen functions and with an average molecular weight in the range of $10^4$ to $10^8$.

High-molecular-weight amines according to this invention are primarily those exhibiting a basic structure of the general formula

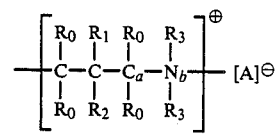

wherein
$R_0$ is H—,
$R_1$ is H—, HO—, or an alkyl group of 1-3 carbon atoms;

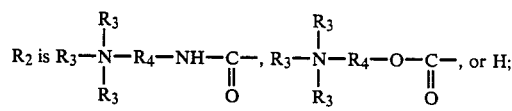

$R_3$ is H— or an alkyl or alkylene group of 1-6 carbon atoms linked to other units of the basic structure of the general
$R_4$ is an alkylene group of 1-12 carbon atoms;
a is 0 or 1; and
b is 0 or 1.

Among the high-molecular-weight amines according to the invention, preferred amines can be subdivided into four groups.

GROUP I

These amines have a basic structure of the general formula wherein
$R_0$, $R_1$ and $R_2$ are H—;
$R_3$ is H— or an alkyl group of 1-6 carbon atoms;

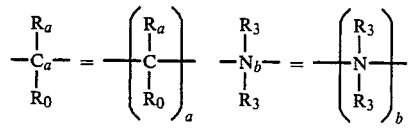

a=0; and
b=1.

The amines of group I generally exhibit a molecular weight of about $10^4$ to $5 \times 10^5$, preferably $4 \times 10^4$ to $2 \times 10^5$.

GROUP II

The basic structure of the group II amines has a general formula wherein
$R_0$ and $R_2$ are H—;
$R_1$ is HO—;
$R_3$ is H— or an alkyl group of 1-6 carbon atoms;
a=1; and
b=1.

The amines of group II generally have a molecular weight of about $10^4$ to $8 \times 10^5$, preferably $10^4$ to $2 \times 10^5$.

GROUP III

The amines of this group have a basic structure of the general formula wherein
$R_0$ is H—;
$R_1$ is H— or an alkyl group of 1-3 carbon atoms;

$R_2$ is 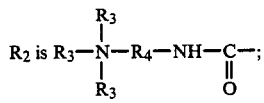

$R_3$ is H— or an alkyl group of 1-6 carbon atoms;
$R_4$ is an alkylene group of 1-12 carbon atoms;
a is 0; and
b is 0.

The molecular weight of group III amines is about $10^5$ to $10^8$, preferably $10^5$ to $8\times10^6$.

GROUP IV

These amines exhibit a basic structure of the general formula wherein
$R_0$ is H—;
$R_1$ is H— or an alkyl group of 1-3 carbon atoms;

$R_2$ is 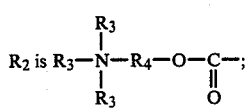

$R_3$ is H— or an alkyl group of 1-6 carbon atoms;
$R_4$ is an alkylene group of 1-12 carbon atoms;
a is 0; and
b is 0.

The molecular weight of group IV amines is generally from about $10^5$ to $10^8$, preferably $10^5$ to $8\times10^6$.

Expressed in general terms, the molecular weight of the amines is about $10^4$ to $10^8$, preferably $10^4$ to $8\times10^6$. The indicated molecular weights are expressed as weight average values, measured e.g. by light scattering. The high-molecular amines are straight-chain or made of a branched structure.

The high-molecular-weight amines of this invention are added to the elastomer latex in amounts of about 0.1-15 parts by weight, preferably in quantities of 0.3-5 parts by weight, especially in amounts of 0.3-2 parts by weight, all based on 100 parts by weight of elastomer solid.

The amines of this invention are known (see, e.g., KirkOthmer, *Encyclopedia of Chemical Technology*, 3rd edition, Vol. 10: pp. 489-523 [1980]) and are obtainable commercially.

The anion [$A^\ominus$] of the high-molecular-weight amines does not possess any decisive significance with respect to the invention. Preferably, it represents the hydroxide ion $OH^\ominus$ or the anion of an organic or inorganic acid such as for example, sulfate, hydrogen sulfate, phosphate, acetate, oxalate, a halogen or similar anions which are compatible with the underlying process.

All the alkyl groups mentioned above can be straight chained or branched and chosen from methyl, ethyl, n-propyl, i-propyl, n-butyl, i-butyl, sec-butyl, t-butyl, or a pentyl, hexyl, heptyl, octyl, nanyl, decyl, undecyl or dodecyl group. The same holds for the corresponding alkylene groups.

Suitable elastomer latices are, on the one hand, those based on natural rubber or degraded natural rubber and, on the other hand, those of homo- and copolymers of conjugated dienes as producible by free radical polymerization with the use of an emulsifier in accordance with known methods of the state of the art (see, for example, Houben-Weyl, "Methoden der organischen Chemie" [Methods of Organic Chemistry] XIV/1: 712 et seq. [1961], "Production of Elastomers"; Ullmanns Enzyklopaedie der technischen Chemie, 9: 325-339 [1957], as well as German Pat. No. 679,587; 873,747; and 1,130,597). It is likewise possible to utilize mixtures of rubber latices.

Degraded natural rubber latices (i.e., natural rubber latices in which the molecular weight of the elastomer has been reduced by an oxidative degradation process can be obtained, for example, according to the method of British Pat. No. 749,955. However, degraded natural rubber latices are utilized with preference as they are obtained by means of a method disclosed in copending U.S. Application Ser. No. 021,031 filed 3-2-87. (DOS 36 06 745) [Attorney's Docket Huels 683], filed on even date, herein incorporated by reference or in British Pat. No. 749,955. This method is characterized by treating the natural rubber in latex form with a mixture of oxygen and an inert gas, and/or a compound containing the peroxide group, at temperatures of about 60°-100° C.

Suitable conjugated dienes are 1,3-butadiene, isoprene, piperylene, 2-chloro-1,3-butadiene, 2,3-dichloro-1,3-butadiene, and 2,3-dimethyl-1,3-butadiene. The copolymers can be produced from mixtures of these conjugated dienes as well as from mixtures of these conjugated dienes with vinyl compounds, such as, for example, styrene, α-methylstyrene, acrylonitrile, acrylic acid, methacrylic acid, and vinylpyridine.

The solids content of the latices is generally about 20-35% by weight.

The aqueous elastomer latex may also contain conventional auxiliary agents in conventional amounts. See, e.g., Abele et al. "Kautschuk-Chemikalien und -Zuschlagstoffe" in Ullmanns Encyclopädie der Technischen Chemie, 4. Auflage, Band 13, Seite 637 ff, Weinheim 1977 incorporated by reference herein.

Preferred active fillers are the carbon blacks of all stages of activity customary in the rubber industry, such as, for example, SAF, ISAF, HAF carbon blacks, including their modifications FEF, GPF, APF, SRF, and MT carbon blacks. However, it is also possible to use colored carbon blacks or conductive carbon blacks with surface areas of up to about 1,300 $m^2/g$ (BET).

Also (precipitated, pyrogenic) highly active silicic acids having surface areas of about 50 $m^2/g$ to 600 $m^2/g$ (BET) can be utilized as the fillers. Preferably, the silicic acids are rendered hydrophobic with the aid of commercially available adhesion promoters (see, for example, EP-OS 126,871). A preferred silicic acid is that of commonly assigned, copending application Serial No. [Attorney's Docket Huels 680] or US-PS 1,043,282 which are incorporated by reference herein.

Combinations of carbon blacks with light-colored fillers are possible within the limits indicated for the individual components. Suitable light-colored fillers include mineral compounds.

The amount of carbon black employed can be about 20 to 300 parts by weight per 100 parts by weight of elastomer, preferably 35 to 120 parts by weight per 100 parts by weight of elastomer.

The amount of mineral compounds can be about 20 to 300 parts by weight per 100 parts by weight of elastomer, preferably 30 to 150 parts by weight per 100 parts by weight of elastomer.

The filler suspensions are generally prepared by making a slurry of the filler or fillers in water and subsequently dispersing the slurry in a commercially available, so-called dispersing device until the individual filler particles have an average grain diameter of less than about 10 μm, volume average (measured according to DIN [German Industrial Standard] 53 477).

If plasticizer oils are to be incorporated, the refinery products customarily used for this purpose can be employed. These products consist of, depending on the usage for the vulcanizates, preferably aromatic, naphthenic or, respectively, paraffinic hydrocarbons. The quantity of plasticizer oils to be used is about 1 to 100 parts by weight, based on 100 parts by weight of elastomer. The making of a plasticizer oil containing filled elastomer powder can be performed, for example, by combining the plasticizer oil in suitable mixing units (e.g., fluid mixers) with the filler-containing elastomer produced in accordance with the process of this invention.

For the performance of the process, the pH value of the filler suspension can vary over wide ranges. An essential aspect when setting the pH is that the final mixture of elastomer latex and filler suspension have a pH value of about 2 to 11, preferably from 4 to 7. If it should be discovered after mixing that the pH value has not resulted in the desired complete precipitation, then the pH value can also be readjusted in the mixture proper. For adjusting the pH value, the usual mineral acids are utilized, such as, for example, sulfuric acid, phosphoric acid, or hydrochloric acid. The preferred acid is sulfuric acid.

The pH in the final mixture is selected preferably so that it is in the acidic range when using synthetic elastomer latices, and in the alkaline range when utilizing natural rubber latices. Moreover, the final pH should be selected, in case of carbon-black-filled batches, in dependence on the activity stage of the carbon black employed. With rising carbon black activity, the pH can be maintained at a lower value.

An essential factor for the best success of the process is the correct mixing of high-molecular-weight amine and latex. Thus, the latex, prior to adding the amine, should exhibit a temperature of about room temperature up to about 95° C. The mixing step should be executed so that there occurs no local overconcentration of the amine and coagulation is to be avoided in any case.

After mixing latex and amine, the mixture should be handled with care. In other words, the mixture should not be subjected to substantial shear forces and the temperature, ionic strength, and similar variables should—if at all possible—be kept constant.

Precipitation is brought about by combining the filler suspension with the elastomer latex containing the amine of this invention. Precipitation can take place discontinuously as well as continuously.

It is also possible to combine the whole amount of elastomer latex containing the high-molecular-weight amine with merely a portion of the provided filler suspension. This portion generally involves about 50 to 98% by weight, preferably 60–95% by weight, of the quantity of filler suspension provided in total. After precipitation has taken place, the remainder of the filler suspension is then added.

The grain size can be affected by varying the amount of amine, in that by increasing amine proportions smaller grain diameters are obtained and by decreasing amine proportions larger grain diameters are obtained.

Elastomer powders are obtained with the aid of the process of this invention wherein the individual powder grain is formed from primary particles having a diameter of about 3–100 μm, preferably 10–30 μm, the filler being intercalated among the individual primary particles.

As compared with the state of the art, the process of this invention offers the advantage of an insensitive mode of operation. It is possible to utilize all of the emulsifiers customary in the manufacturing technique for elastomer. The pH can vary within wide limits without causing reduction in quality of the resultant pulverulent elastomer. Since it is possible, according to this invention, to operate also in the alkaline region, even degraded natural rubber latex can be readily processed. Furthermore, an advantage of the process of this invention is that it can be carried out without the presence of silicon compounds and aluminum compounds.

The process according to this invention leads to powdered elastomer grades having a narrow grain spectrum with almost constant distribution of the amounts of carbon black. In high filler content grades, the filler is securely bound so that undesired dust formation is not encountered and even at lower filler contents, a mechanically stable grain structure is attained permitting storage and handling of the powdered elastomer without any problems.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight, unless otherwise indicated.

In the examples, pH values were measured by means of devices of the Schott Company (type CG 822) and the Metrohm Company (type E 520).

The shear test measurements and determinations of compressive strength took place at 20° C. (according to Jenike and Johannson in a Flow Factor Tester—process technique 2, 10, 68 [1976]).

EXAMPLES

Example 1 (Table I)

The elastomer latex employed is one that is commercial available (latex type 1502 of Bunawerke Hüls GmbH; styrene content: 23.5% by weight-remainder butadiene; solids content: about 22% by weight). The high-molecular-weight amine used is a commercially available product from group II of the specification ("SUPERFLOC"; $R_3$ is a short-chain alkyl group; molecular weight: about $5 \times 10^4$).

The latex is charged into a 0.5 m³ reactor at room temperature. Under thorough agitation (propeller agitator, diameter 18 cm, about 400 rpm), a water-diluted amine solution (1% by weight) is added so that 1 part by weight of amine is present in the mixture—based on 100 parts by weight of elastomer solid. After a brief residence time (<10 sec), an aqueous carbon black suspension (6% by weight) is added. This suspension contains the amount of sulfuric acid required for attaining the final pH value.

The water is separated from the precipitated elastomer powder on a belt filter. The powder is dried in a warm air stream under constant agitation.

TABLE I

| Test No. | Carbon Black Grade | Carbon Black Content (*) | pH Value (**) | Jenike Test [N/m²] (0 Hours: 20° C.) |
|---|---|---|---|---|
| 1 | N 339 | 50 | 6.9 | 870 |
| 2 | N 339 | 150 | 6.8 | 420 |
| 3 | Raven 3200 | 50 | 5.7 | 660 |
| 4 | Raven 3200 | 35 + 5 (***) | 4.7 | 690 |
| 5 | Ketjenblack EC | 50 | 5.0 | 370 |
| 6 | Ketjenblack EC | 35 + 5 (***) | 4.6 | 390 |
| 7 | Ketjenblack EC | 17.5 + 2.5 (***) | 4.3 | 980 |

(*) Parts by weight per 100 parts by weight of elastomer solid
(**) In the precipitation suspension
(***) Addition in two steps, the second part thereof after elastomer precipitation

Example 2 (Table II)

The precipitation step is repeated, using the latex and, respectively, the high-molecular-weight amine employed in Example 1, with the difference that continuous precipitation is carried out. Two mass streams (stream 1. latex+amine—addition of amine about 4 seconds before combining with stream 2; stream 2. carbon black suspension+sulfuric acid) are combined by means of a mixing unit at room temperature.

Processing takes place in accordance with Example 1.

TABLE II

| Test No. | Carbon Black Grade | Carbon Black Content (*) | Carbon Black Stream () | Latex Stream () | Amine Stream () | pH Value (*) | Jenike Test [N/m²] (0 Hours; 20° C.) |
|---|---|---|---|---|---|---|---|
| 1 | Corax N 539 | 67 | 2,000 | 838 | 38.7 | 6.8 | 640 |
| 2 | Corax N 539 | 97 | 2,500 | 649 | 30.0 | 6.9 | 440 |

(*) Parts by weight per 100 parts by weight of elastomer solid
(**) Carbon black stream (6% by weight in water) expressed in kg suspension/h
Latex stream expressed in kg latex/h
Amine stream (5% by weight in water) expressed in kg solution/h
(***) In the precipitation liquid

Example 3 (Table III)

A commercially available nitrile rubber latex ("PERBUNAN" grade N 3305; acrylonitrile content: 33% by weight; solids content: about 25% by weight) and a commercially available chlorinated rubber latex ("BAYPREN" grade 210; solids content: about 30% by weight) are utilized.

With the nitrile rubber (Table III, Tests 1-3), a commercial, high-molecular-weight amine of group III of the specification is utilized ("ROHAGIT"; $R_4$ is a short-chain alkylene group; molecular weight: about $10^6$; viscosity [1% by weight in water, 20° C.—measured in a Brookfield viscometer, spindle II, 6 rpm]: about 1,700 mPa·sec). With the chlorinated rubber latex (Table III, Texts 4 and 5), the high-molecular-weight amine is a commercial product of group IV of the specification ("ROHAGIT"; $R_1$ is —$CH_3$; $R_4$ is a short-chain alkylene group; molecular weight: about $10^5$; viscosity [1% by weight in water; 20° C.—measured in a Brookfield viscometer I/6]: about 120 mPa·sec).

Precipitation and processing are performed in correspondence with Example 1, with the exception that the latex is adjusted to the temperature listed in Table III prior to precipitation. The latices are set at a solids content of 20% by weight.

TABLE III

| Test No. | Carbon Black Grade | Carbon Black Content (*) | Temp. () [°C.] | pH Value (*) | Jenike Test [N/m²] (0 Hours; 20° C.) |
|---|---|---|---|---|---|
| 1 | N 339 | 50 | 20 | 7.1 | 880 |
| 2 | Ketjenblack EC | 50 | 20 | 4.5 | 510 |
| 3 | Ketjenblack EC | 50 | 80 | 4.5 | 350 |
| 4 | N 550 | 50 | 20 | 5.2 | 910 |
| 5 | N 550 | 50 | 80 | 5.0 | 720 |

(*) Parts by weight per 100 parts by weight of elastomer solid
(**) Temperature of latex prior to precipitation
(***) In the precipitation suspension

Example 4 (Table (IV)

A commercially available natural latex is utilized (CV-constant viscosity; solids content: about 60–70% by weight)—untreated (Test No. 1—Table IV) and, respectively, treated in accordance with the process disclosed in U.S. Application Ser. No. 021,031 filed 3-2-87 (DOS 36 06 745), i.e., in degraded form (Test Nos. 2-8—Table IV). The high-molecular-weight amine employed is one of group IV (according to Example 3).

Prior to precipitation, the latex is diluted to a solids content of 20% by weight by using water. No acid is added to the carbon black suspension; the process is conducted at the natural pH of the natural rubber latex.

Precipitation and processing take place as disclosed in Example 1.

Defo hardness is determined according to DIN 53 514.

TABLE IV

| Test No. | Carbon Black Grade | Carbon Black Content (*) | Temp. (**) [°C.] | Defo Hardness | Amine Content (*) | Jenike Test [N/m²] (0 hours; 20° C.) |
|---|---|---|---|---|---|---|
| 1 | N 339 | 50 | 20 | 2,800 | 1 | 550 |
| 2 | N 339 | 45 + 5 (***) | 80 | 1,800 | 1 | 610 |
| 3 | N 339 | 45 + 5 (***) | 80 | 1,200 | 1 | 790 |
| 4 | N 339 | 45 + 5 (***) | 80 | 700 | 1 | 980 |
| 5 | N 339 | 50 | 50 | 850 | 1 | 870 |
| 6 | N 339 | 40 + 10 (***) | 50 | 850 | 1 | 620 |
| 7 | N 339 | 40 + 10 (***) | 80 | 850 | 0.8 | 580 |

TABLE IV-continued

| Test No. | Carbon Black Grade | Carbon Black Content (*) | Temp. (**) [°C.] | Defo Hardness | Amine Content (*) | Jenike Test [N/m²] (0 hours; 20° C.) |
|---|---|---|---|---|---|---|
| 8 | N 339 | 30 + 20 (***) | 80 | 850 | 0.65 | 480 |

(*) Parts by weight per 100 parts by weight of elastomer solid
(**) Temperature of latex prior to precipitation
(***) Addition in two steps, the second part thereof after elastomer precipitation

Example 5 (Table V)

A degraded natural rubber latex according to Example 4 is utilized. The high-molecular-weight amine is one of group IV (according to Example 3).

Precipitation and processing are carried out as in Example 1, with the difference that, besides carbon black, a commercial silicic acid is employed as well ("VN2-Degussa"; BET surface area: about 130 m²/g). The surface of the silicic acid was rendered hydrophobic with a commercially available adhesion promoter (EP-OS 0 126 871).

TABLE V

| Test No. | Carbon Black Grade | Carbon Black Content (*) | Silicic Acid Content (*) | Amine Content (*) | Jenike Test [N/m²] (0 Hours; 20° C.) |
|---|---|---|---|---|---|
| 1 | — | — | 50 | 1 | 980 |
| 2 | — | — | 50 | 1.5 | 610 |
| 3 | N 339 | 40 | 15 | 1.3 | 1,100 |
| 4 | N 339 | 40 | 15 | 1 | 880 |
| 5 | N 339 | 40 | 15 | 0.5 | 520 |

(*) Parts by weight per 100 parts by weight of elastomer solid

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make numerous changes and modifications of the invention to adapt it to various usages and conditions.

What is claimed is:

1. A process for the production of a free flowing filled elastomer comprising combining an aqueous elastomer latex with an aqueous filler suspension in the presence of an amount of a high-molecular-weight amine effective for precipitating the resultant filled elastomer particles, said amine having quaternary nitrogen functions and a weight average molecular weight of about $10^4$ to $10^8$.

2. A process according to claim 1, wherein the high-molecular-weight amine utilized has a basic structure of the general formula

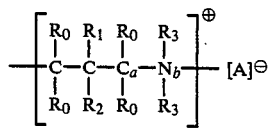

wherein
$R_0$ is H—,
$R_1$ is H—, HO—, or an alkyl group of 1-3 carbon atoms;

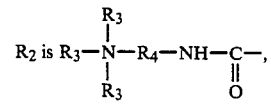

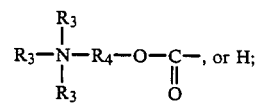

$R_3$ is H— or an alkyl or alkylene group of 1-6 carbon atoms;
$R_4$ is an alkylene group of 1-12 carbon atoms;
a is 0 or 1;
b is 0 or 1; and
A is an anion.

3. A process according to claim 2, characterized in that $[A]^\ominus$ is the hydroxide ion $OH^\oplus$ or the anion of an organic or inorganic acid.

4. A process according to claim 2, characterized in that $R_3$ is an alkylene residue with 1 to 6 carbon atoms linking the basic structures of the general formula.

5. A process according to claim 2, wherein said high-molecular-weight amine is present in an amount of about 0.1-15 parts by weight per 100 parts by weight of solid elastomer in the elastomer latex.

6. A process according to claim 2, further comprising separating the filled elastomer particles from the resultant aqueous phase and subsequently drying the filled elastomer to form pourable elastomer powder.

7. A process according to claim 2, wherein
$R_0$, $R_1$ and $R_2$ are H—;
$R_3$ is H— or an alkyl group of 1-6 carbon atoms;
a is 0; and
b is 1.

8. A process according to claim 2, wherein
$R_0$ and $R_2$ are H—;
$R_1$ is HO—; or
$R_3$ is H— or an alkyl group of 1-6 carbon atoms;
a is 1; and
b is 1.

9. A process according to claim 2, wherein
$R_0$ is H—;
$R_1$ is H— or an alkyl group of 1-3 carbon atoms;

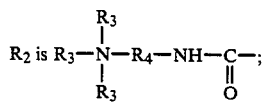

$R_3$ is H— or an alkyl group of 1-6 carbon atoms;
$R_4$ is an alkylene group of 1-12 carbon atoms;
a is 0; and
b is 0.

10. A process according to claim 3, wherein
$R_0$ is H—;
$R_1$ is H— or an alkyl group of 1-3 carbon atoms;

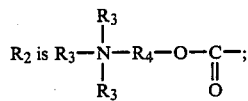

$R_3$ is H— or an alkyl group of 1-6 carbon atoms;
$R_4$ is an alkylene group of 1-12 carbon atoms;
a is 0; and
b is 0.

11. A process according to claim 1, wherein the high-molecular-weight amine utilized has an average molecular weight of about $10^4$ to $8 \times 10^6$.

12. A process according to claim 2, wherein the high-molecular-weight amine utilized has an average molecular weight of about $10^4$ to $8 \times 10^6$.

13. A process according to claim 7, wherein the high-molecular-weight amine utilized has an average molecular weight of about $10^4$ to $5 \times 10^5$.

14. A process according to claim 8, wherein the high-molecular-weight amine utilized has an average molecular weight of about $10^4$ to $8 \times 10^5$.

15. A process according to claim 9, wherein the high-molecular-weight amine utilized has an average molecular weight of about $10^5$ to $10^8$.

16. A process according to claim 10, wherein the high-molecular-weight amine utilized has an average molecular weight of about $10^5$ to $10^8$.

17. A process according to claim 2, wherein the high-molecular-weight amine is present in an amount of about 0.3–5 parts by weight per 100 parts by weight of solid elastomer in the elastomer latex.

18. A process according to claim 2, wherein the high-molecular-weight amine at a temperature of about room temperature to about 95° C. is added to the elastomer latex prior to combining the latex with the filler suspension.

19. A process according to claim 2, wherein after combining the elastomer latex with the filler suspension the resultant mixture has a pH of about 2–11.

20. A process according to claim 2, wherein about 50–98% by weight of the filler suspension is initially combined with the elastomer latex and after precipitation of the elastomer particles the remainder of the filler suspension is added.

* * * * *